(12) United States Patent
Lentz et al.

(10) Patent No.: US 6,377,284 B1
(45) Date of Patent: Apr. 23, 2002

(54) METHOD OF GEOMETRICALLY EXPANDING VERTICALLY COMPRESSED LISTS OF DATA

(75) Inventors: James Lee Lentz; Ricky Lee Poston, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,206

(22) Filed: Dec. 10, 1998

(51) Int. Cl.[7] .................................................. G06F 3/14
(52) U.S. Cl. ..................... 345/764; 345/841; 345/842; 345/853; 345/179; 345/810
(58) Field of Search ................................. 345/353, 179, 345/145, 539, 352, 356, 357, 339

(56) References Cited

U.S. PATENT DOCUMENTS

| | | | |
|---|---|---|---|
| 5,060,135 A | | 10/1991 | Levine et al. |
| 5,341,466 A | * | 8/1994 | Perlin et al. ................. 345/539 |
| 5,375,199 A | | 12/1994 | Harrow et al. |
| 5,583,981 A | | 12/1996 | Pleyer |
| 5,623,588 A | * | 4/1997 | Gould ......................... 345/145 |
| 5,627,954 A | | 5/1997 | McFarland |
| 5,670,984 A | * | 9/1997 | Robertson et al. .......... 345/139 |
| 5,692,142 A | | 11/1997 | Craycroft et al. |
| 5,731,805 A | | 3/1998 | Tognazzini et al. |
| 5,960,437 A | * | 9/1999 | Krawchuk et al. .......... 707/102 |

* cited by examiner

*Primary Examiner*—Raymond J. Bayerl
*Assistant Examiner*—Thomas T. Nguyen
(74) *Attorney, Agent, or Firm*—Volel Emile; Leslie A. Van Leeuwen

(57) ABSTRACT

A method and apparatus for expanding a compressed list of displayed items are provided. Each item in the list is made up of a plurality of rows of pixels. When the list is fully compressed, each item is displayed by displaying only one row of pixels. The method entails using a pointer to touch the first character of an item. When that occurs, the item is expanded by displaying every other row of pixels. If the pointer touches more than one character of the item then the item will be fully expanded by having all of its rows of pixels displayed.

9 Claims, 13 Drawing Sheets

METHOD OF GEOMETRICALLY EXPANDING VERTICALLY COMPRESSED LISTS OF DATA

CROSS REFERENCE TO RELATED APPLICATIONS

The present application is related to the following applications: (1) application Ser. No. 09/210,205, entitled "Method of Vertically Compressing a Large List of Data to Fit on a Screen", (2) application Ser. No. 09/210,207, entitled "Method of Compressing and Expanding Large Lists of Data" and (3) application Ser. No. 09/210,208, entitled "Method of Quickly Expanding Large Lists of Compressed Data. All three applications were filed on Dec. 10, 1998 and assigned to the same assignee as the present application.

BACKGROUND OF THE INVENTION

1. Field of the Invention

The present invention relates to user interactive computer supported display technology and more particularly to such user interactive systems and methods which are user friendly and provide easy to use interactive user interfaces.

2. Description of the Related Art

The 1990's decade has been marked by a technological revolution driven by the convergence of the data processing industry with the consumer electronics industry. This advance has been even further accelerated by the extensive consumer and business involvement in the internet over the past few years. As a result of these changes, it seems as if virtually all aspects of human endeavor in the industrialized world requires the distribution of information through interactive computer display interfaces. Information for reporting, marketing, technology and educational purposes, which in the past was permitted days and even months for distribution, are now customarily required to be "on-line" in a matter of hours and even minutes. The electronic documents through which such information is distributed is made up of a variety of information types, e.g. text, graphics, photographs and even more complex image types. Because of the limited time factors involved in the creation, updating and reading of computer displayed documents, there is a need for a method and system for navigating through these documents which are fast and relatively effective.

For example, the conventional method of allowing a user to view very large sets of data in tree, table or list formats is to display every item in the list. The user is then provided with a scroll bar that moves a small window in a vertical direction. At any time, however, only a very small segment of the tree or list is displayed. Thus, in order for a user to view an entire structure of a large data set, the user has to scroll through the entire list of data. Even then, however, the user may not be able to visualize the whole structure of the data set.

A method and system to provide a user the ability to potentially view an entire structure of a large list of data on a view screen were devised. For instance, the method entailed compressing the items on the list to such an extent as to have all the items displayed on the screen. To achieve this feat, however, only one row of pixels was used to represent each item on the list. Obviously, this amount of compression did not allow the items to be legible or quite recognizable. Thus, a need exists for a method of quickly making legible or recognizable any item of interest on that fully compressed list without reconstructing all the other items.

SUMMARY OF THE INVENTION

The need is addressed by the present invention. Each item on the list is made up of a plurality of rows of pixels. When the list is fully compressed, each item is displayed by displaying only one row of pixels. The invention allows for the use of a pointer to expand one item in the list. For example, when the pointer touches the first character of an item, the item is expanded by displaying every other row of pixels of the item. If the pointer touches more than one character of the item then the item will be fully expanded by having all of its rows of pixels displayed.

DESCRIPTION OF THE INVENTION

Figure 1:
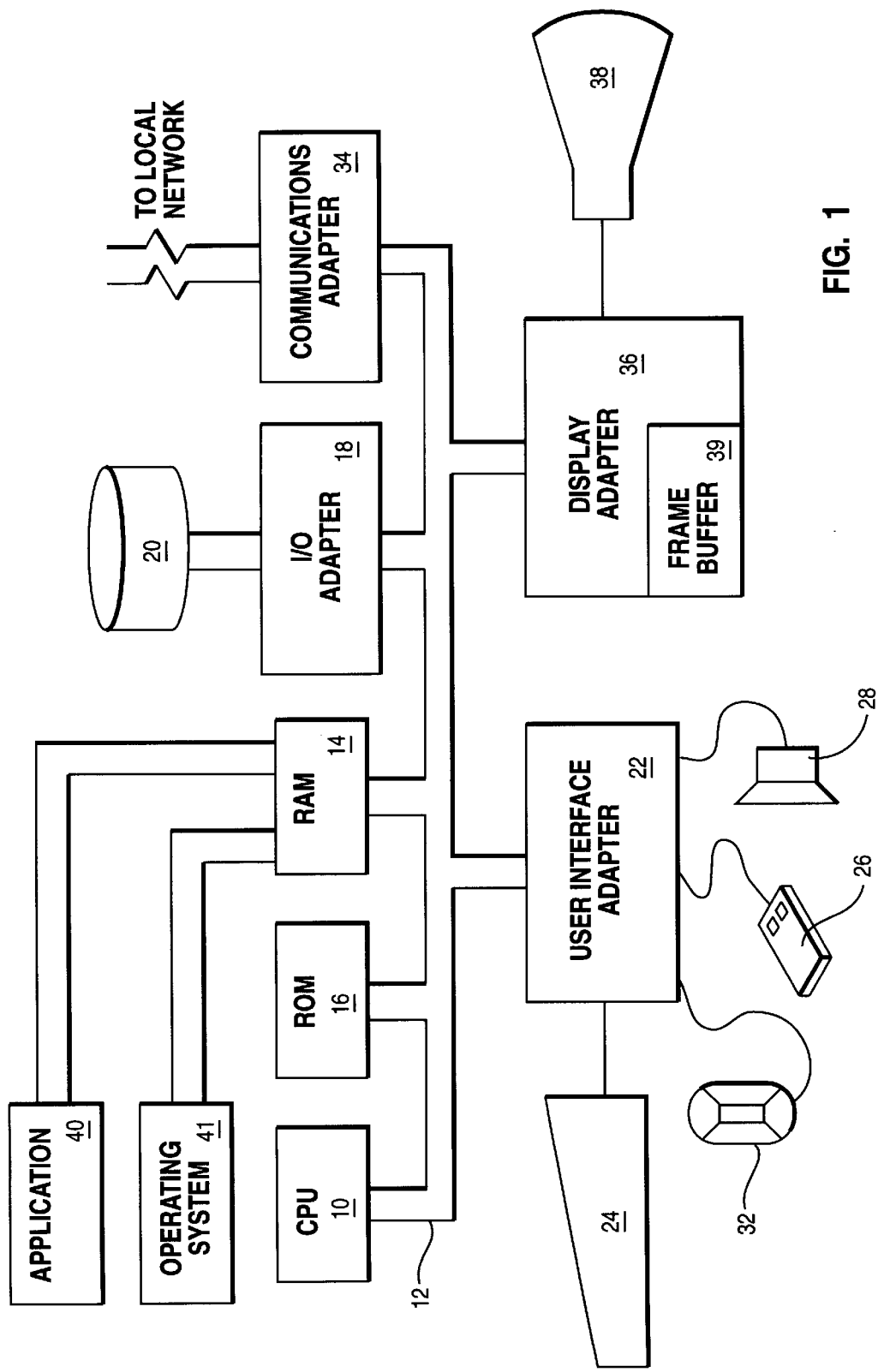
FIG. 1 is a typical data processing system is shown which may function as the computer controlled display terminal used in implementing the present invention.

Referring to FIG. 1, a typical data processing system is shown which may function as the computer controlled display terminal used in implementing the present invention. A central processing unit (CPU) 10, such as one of the PC microprocessors available from International Business Machines Corporation (IBM), is provided and interconnected to various other components by system bus 12. An operating system 41 runs on CPU 10 and provides control. The operating system 41 also coordinates the function of the various components of FIG. 1. The operating system 41 may be one of the commercially available operating systems such as the OS/2 operating system available from IBM (OS/2 is a trademark of IBM); Microsoft's Windows 95(™), Windows 98(™) or Windows NT(™), as well as the UNIX or AIX operating systems.

A program for compressing and expanding large sets of objects in a tree, table or list view, application 40, to be subsequently described in detail, runs in conjunction with the operating system 41. Application 40 provides output calls to the operating system 41. The operating system 41 implements, inter alia, the various functions performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the application 40, are loaded into RAM 14, which is the computer system's main memory. I/O adapter 18 may be a small computer system interface (SCSI)

adapter that communicates with the disk storage device 20, i.e. a hard drive. Communications adapter 34 interconnects bus 12 with an outside network enabling the data processing system to communicate with other systems over a local area network (LAN) and/or wide area network (WAN) such as the internet. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices, particularly the mouse 26, that a user may employ the present invention.

Display adapter 36 includes a frame buffer 39 which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment, which will be subsequently described, the mouse will be the input means through which the user will interface with the system. The display terminal of FIG. 1 communicates with the network through the communications adapter 34.

Figure 2:
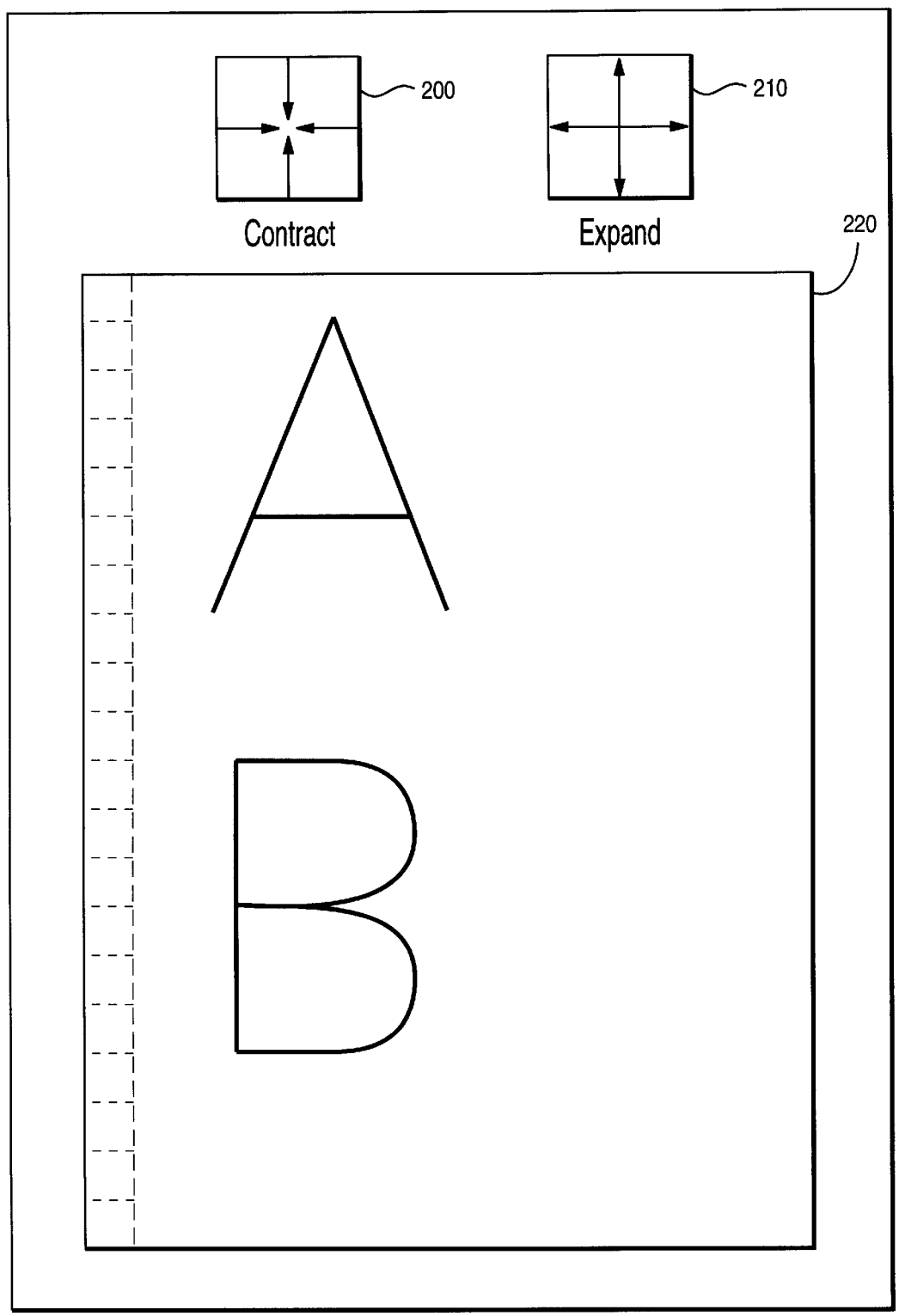
FIG. 2 is a graphical user interface (GUI) used by the present invention.

FIG. 2 is a graphical user interface (GUI) used by the present invention. The GUI has a contract button 200, an expand button 210 and an area 220 within which data is displayed. For example, items A and B are displayed in area 220. Items A and B may be regarded as a couple of items in a very large list of data. For the sake of convenience and in order not to obfuscate the disclosure of the invention, the rest of the items in the list are not shown.

In conventional tree or table format of data listings, the viewlist is constructed of a series of rows of information. Each row may contain an icon and one or more strings of text and are separated from each other by several rows of pixels of blank space (or blank pixels). For example, in FIG. 2, items A and B occupy each six (6) rows and are separated from each other by three (3) rows of blank pixels.

Each time the contract button 200 is selected (each time a user clicks on the contract button 200), the rows of blank pixels are reduced. For example, one row of blank pixels is removed between each pair of items at each activation of the contract button 200 (default setting) or more rows of pixels may be removed as per user configuration. When only a single row of blank pixels remains, the items themselves then begin to get compressed. Here again, one row of pixels from each item may be removed at each activation of the contract button 200 (default setting) or more rows, as configured by a user, may be removed.

When fully compressed, each item in the list is reduced to a single row of pixels separated by a row of blank pixels. The horizontal information (i.e., the length of each row of text) is fully preserved providing the visual indication of the data structure of each item. Since all the items in the list may be on the screen, the overall structure of the whole list may then become visible to a user. However, it is obvious that this extent of compression does not allow for the continued legibility of the displayed items.

Conversely, the expand button 210 may be used to incrementally restore a compressed table or tree to its original size. The restoration may be accomplished just the same way the rows of pixels (blank or otherwise) were removed (default setting). That is, each time the expand button 210 is selected, one or more rows of pixels may be restored as per the compressed user configuration. (Note that the rows of blank pixels are replaced last.) Just as in the compression process, the expand process may also be made user configurable. The configuration may entail restoring anywhere from one row of pixels to the whole tree or table (including the rows of blank pixels) at the first selection of the expand button 210.

Figure 3:
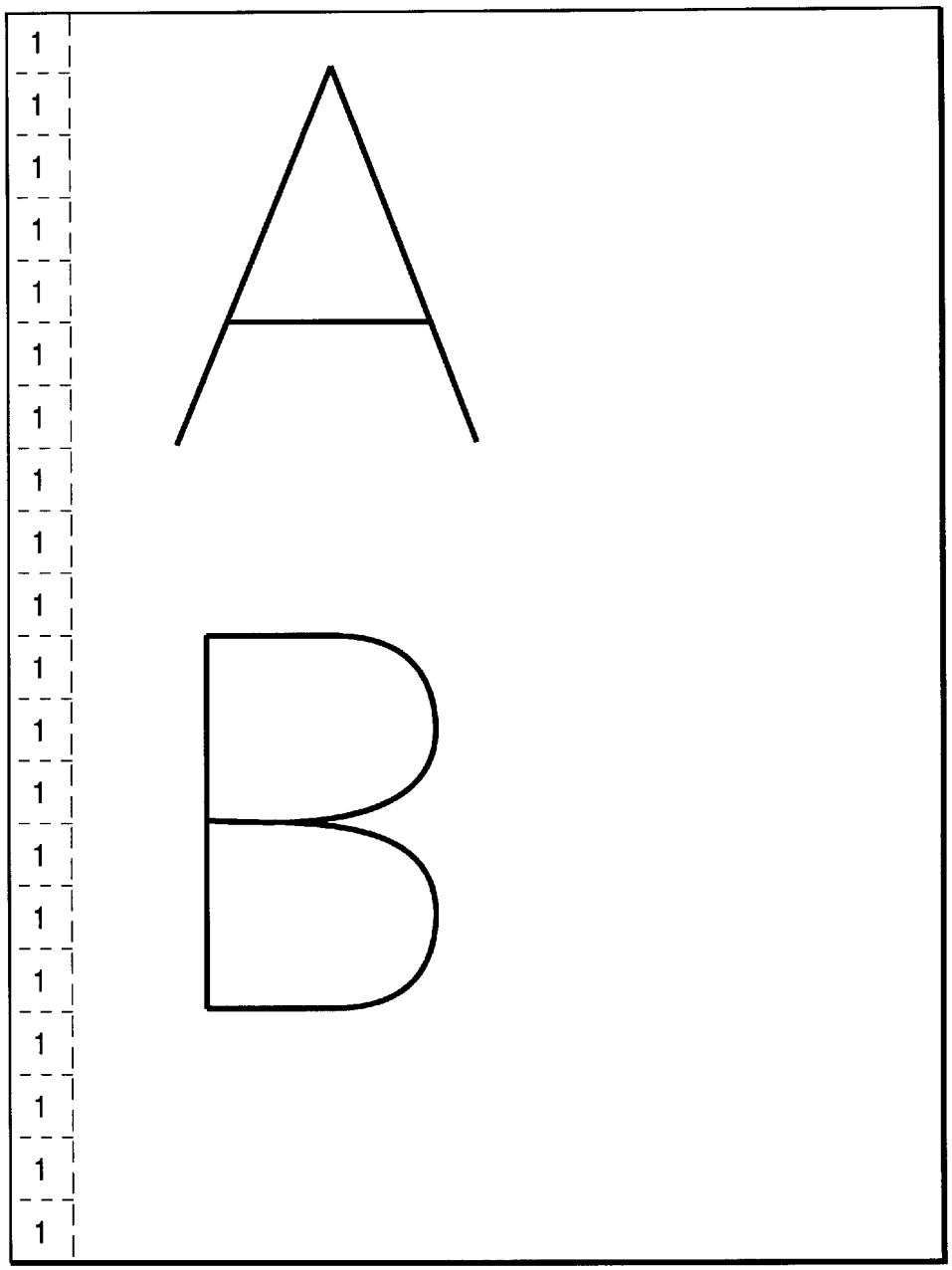
FIGS. 3 and 4 are bit maps of a dataset as used by the present invention.
Figure 4:
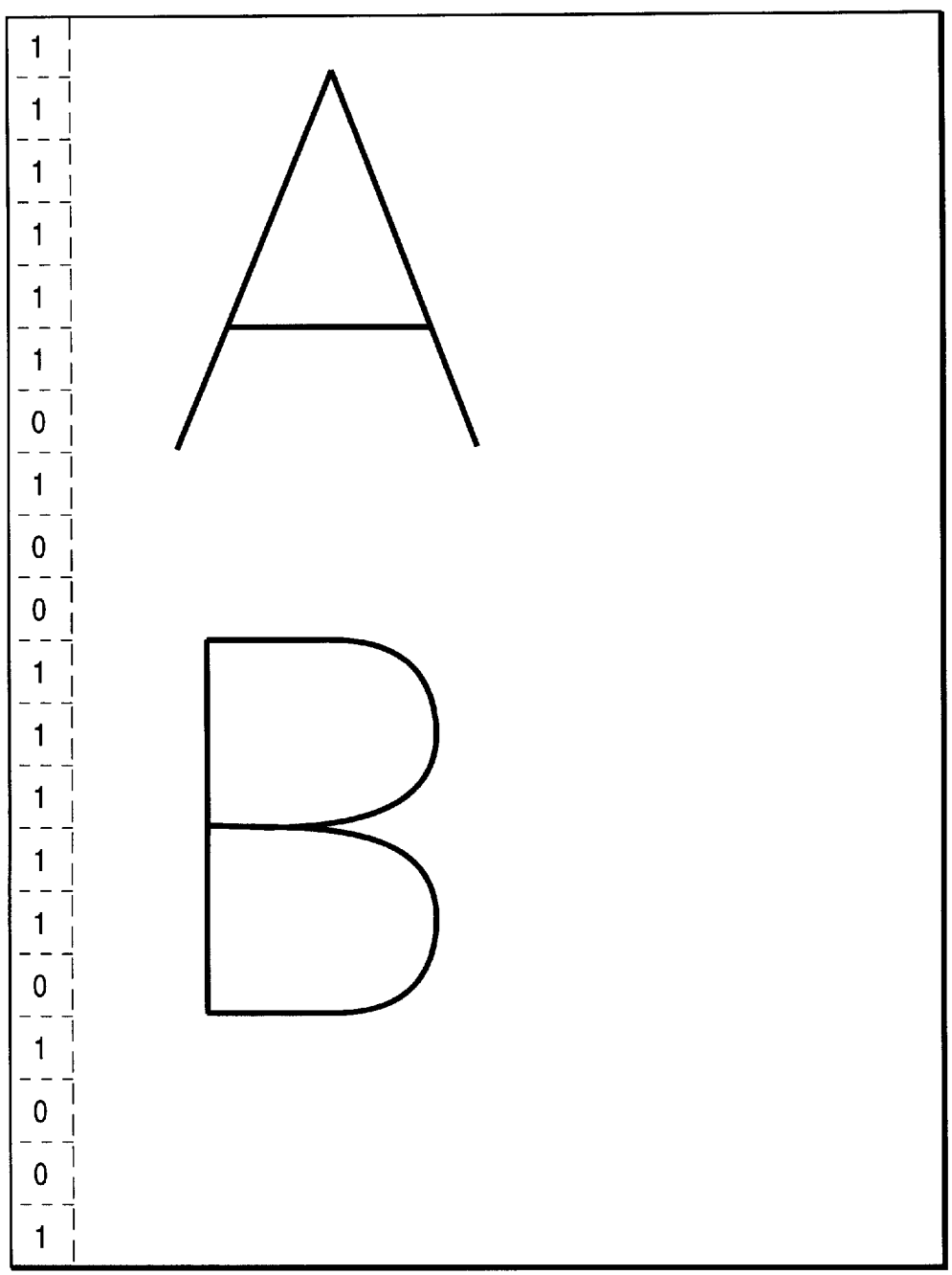

The information of the tree or table of the list of data is stored in a bitmap as shown in FIGS. 3 and 4. Each row of pixels in the bitmap is designated as a visible row or a non-visible row. Visible rows are indicated with a "1" and non-visible rows are indicated with a "0" in a one-square margin of the bit map (see FIG. 4). FIG. 3 is the original bit map of the list of data (note that all the rows are indicated as visible).

As was explained earlier, each time the user selects the contract button 200, a row of pixels is removed. The first rows of pixels to be removed are the rows of blank pixels, then the character rows (i.e., the rows of pixels representing items A and B). Thus in FIG. 4, it can be seen that the contract button 200 has been used three times, each time a row of pixels is changed from visible to non-visible.

Figure 5:
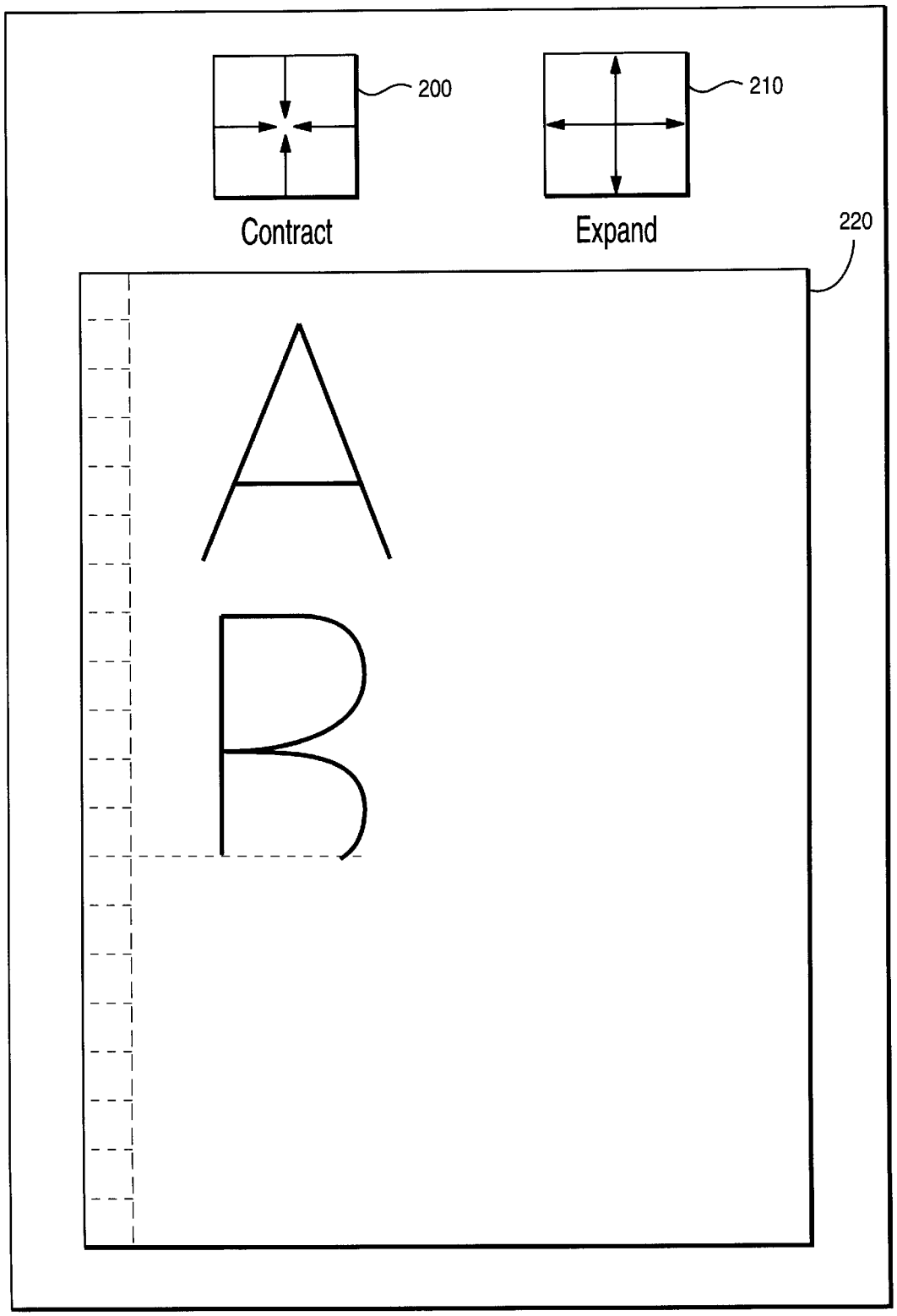
FIG. 5 is a display of a bit map with rows pixels designated as non-visible pixels.

FIG. 5 is the display of the bitmap of FIG. 4. As shown in FIG. 5, there is only one row of blank pixels between items A and B since the other two rows of blank pixels are designated as rows of non-visible pixels in FIG. 4. In addition, the last row of pixels making up items A and B, which also has been designated as a row of non-visible pixels, is removed. It is worth noting that since the original information of the list of data is retained in the stored bitmap, a fully compressed list of data can always be reconstructed on the screen to its exact original version.

Figure 6A:
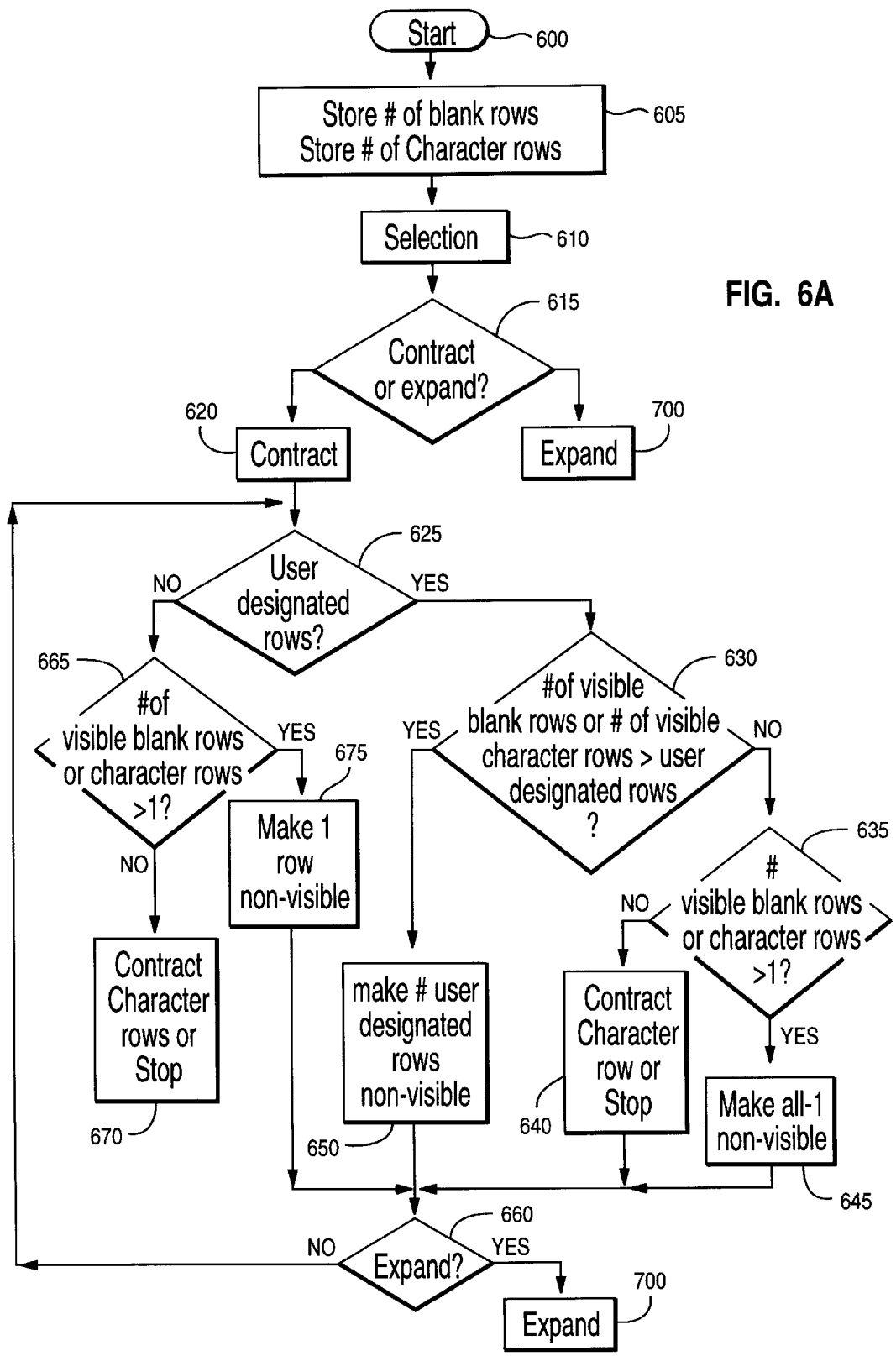
FIGS. 6A and 6B are a flow chart a method of compressing a list of data used to implement the present invention.
Figure 6B:
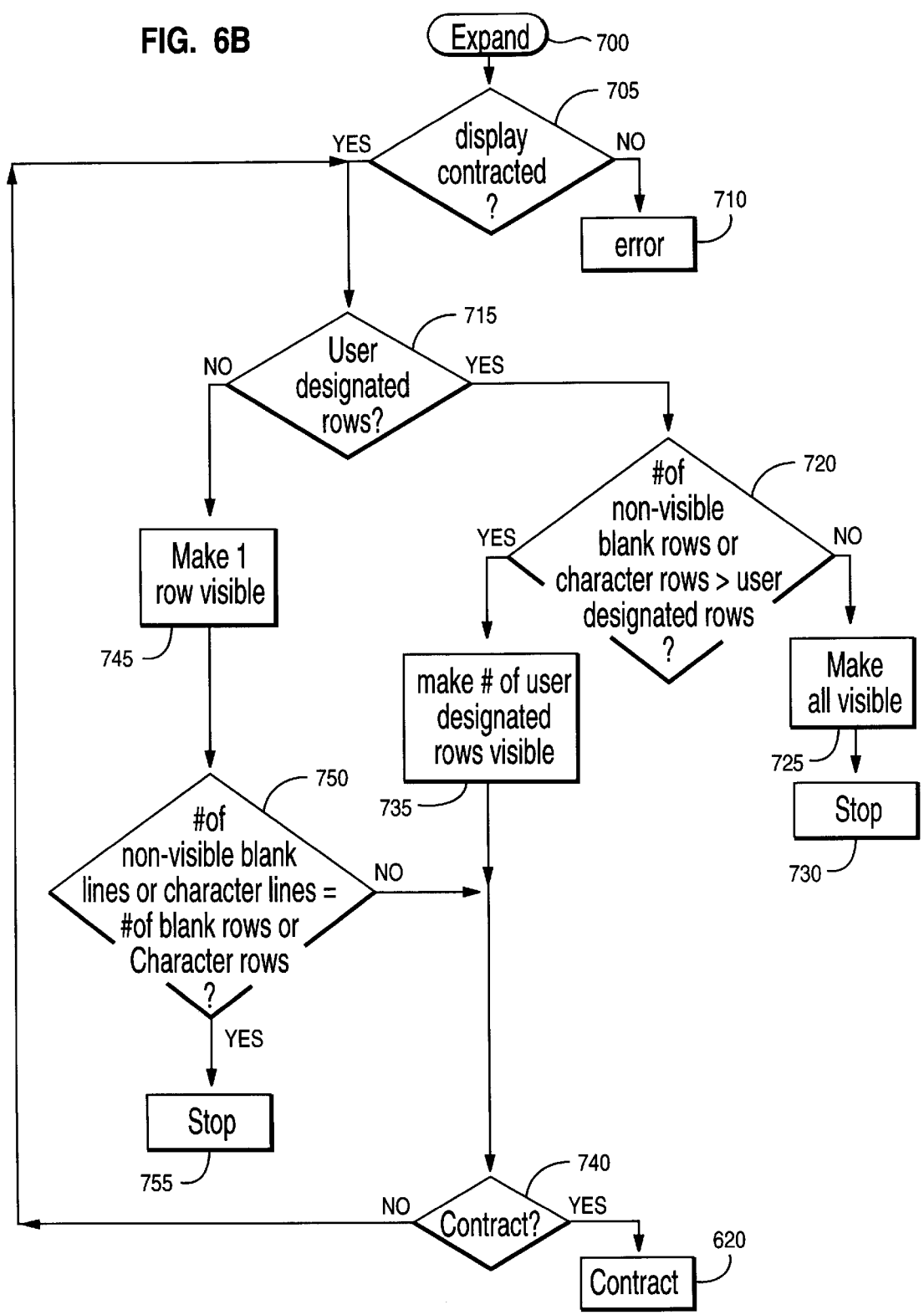

FIG. 6 is a flowchart of a method of compressing a list of data used to implement the present invention. The process starts at step 600 and at step 605, the number of blank rows separating the items and the number of character rows of the items are determined and stored for future reference. At steps 610 and 615, the user chooses whether the display of the items is to be contracted or expanded. If the display is to be expanded, the process will continue at step 700. If the display is to be contracted, the process will continue at step 620.

In the case where the display is to be contracted, the user is given a choice as to whether more than the default one row of pixels should be removed at a time (step 625). If the user decides to remove more than one row at a time, which will be referred to as user designated rows, then it is determined whether the number of visible blank rows is greater than the number of user designated rows (step 630). If the number of visible blank rows is greater than the number of user designated rows, then the number of user designated rows is made non-visible (step 650) and the user is given a choice as to whether the display should now be expanded (step 660). If the display is to be expanded, then the process will continue at step 700. Otherwise, the process returns to step 625.

If the number of visible blank rows is less than the number of user designated rows, then a determination is made as to whether the number of visible blank rows is greater than one (step 635). If the number of visible blank rows is greater than one then all the rows minus one are made non-visible (step 645) and the process continues to step 660. But, if the number of visible blank rows is not greater than one, then that is an indication that character rows should start being removed (step 640) and the process will go on to step 660.

As usual, the process will give the user a chance to designate how many character rows should be removed at each iteration instead of the default one row. Thus, the whole process, beginning at step 625, will be repeated for the character rows. Note that when character rows, instead of visible blank rows, are being removed after the determination that the number of visible rows is not greater than one, the process will stop at step 640.

If the user has not designated a number of rows to be removed at each iteration, then the default one row will be removed. But, before doing so, it has to be ascertained that the number of visible blank rows (or character rows in the case where character rows are being removed) is greater than one (step 665). If so, then one visible row (one blank row in the case where blank pixels are being removed or one character row in the case where character rows are being removed) will be made non-visible (step 675) and the process will continue on to step 660. If the number of visible blank rows is not greater than one, then if blank rows were being removed, character rows will start being removed and if character rows were being removed the process will then stop (step 670).

At anytime, the user may decide to expand, instead of continuing to contract, the display of the list. When and if the user decides to expand the displayed list, the process will jump to step 700. Before expanding the display, however, a check will be made as to whether the display is in a compressed stage (step 705). If the display is not presently compressed, it cannot be expanded and thus an error will occur (step 710). If the display is presently compressed, then at step 715 the user will be given a chance to designate how many rows to be restored at a time (i.e., user designated rows) instead of using the number of rows from the previous contract process. Whether the user designates a number of rows or not, a determination is made as to whether the number of non-visible character rows (or blank rows) is greater than the number of rows to be restored at a time (step 720). If the number of non-visible character rows is not greater than the number of rows to be restored then all the rows (character rows if character rows are being restored or blank rows if blank rows are being restored) are made visible and the process stops (steps 725 and 730). Note that the process will only stop if blank rows were being restored.

If the number of non-visible blank rows is greater than the number of rows to be restored then a number of rows equals to the number of rows to be restored will be made visible (step 735) and the process goes on to step 740 where the user is given a choice as to whether the display should be contracted or continued to be expanded. If the user decides to contract the display, then the process will jump back to step 620; otherwise, the process will return to step 715.

If the default number of rows to restore is one (1) rather that the number of rows that were used during the last contract process and if at step 715, the user does not designate a number of rows to be restored, then only one row (one character row in the case of character rows being restored or one blank row in the case where blank rows are being restored) will be made visible (step 745). A check will then be made as to whether the number of non-visible character rows (or blank rows) is equal to the number of stored character rows (or stored blank rows) (step 750). If character rows were being restored and the number of character rows equals the number of stored character rows then blank rows will next be restored. If, on the other hand, blank rows were being restored and the number of blank rows is equal to the number of stored blank rows then the process will stop (755). If the number of non-visible character rows (or blank rows) is not equal to the number of stored character rows (or stored blank rows) then the process will continue on to step 740.

As mentioned before, when the list is fully compressed, only one character row, per each item, is displayed on the screen. The items therefore are not legible or may not be recognizable. Thus, if a user is interested in a particular item, the user will have to first restore some or all the character rows of all the items in the list (to make the items legible) and then scroll through the list for that item. In this particular case, then, it may be more expedient to scroll through the fully compressed items and to restore each item as it becomes the focus of interest as explained below.

Figure 7:
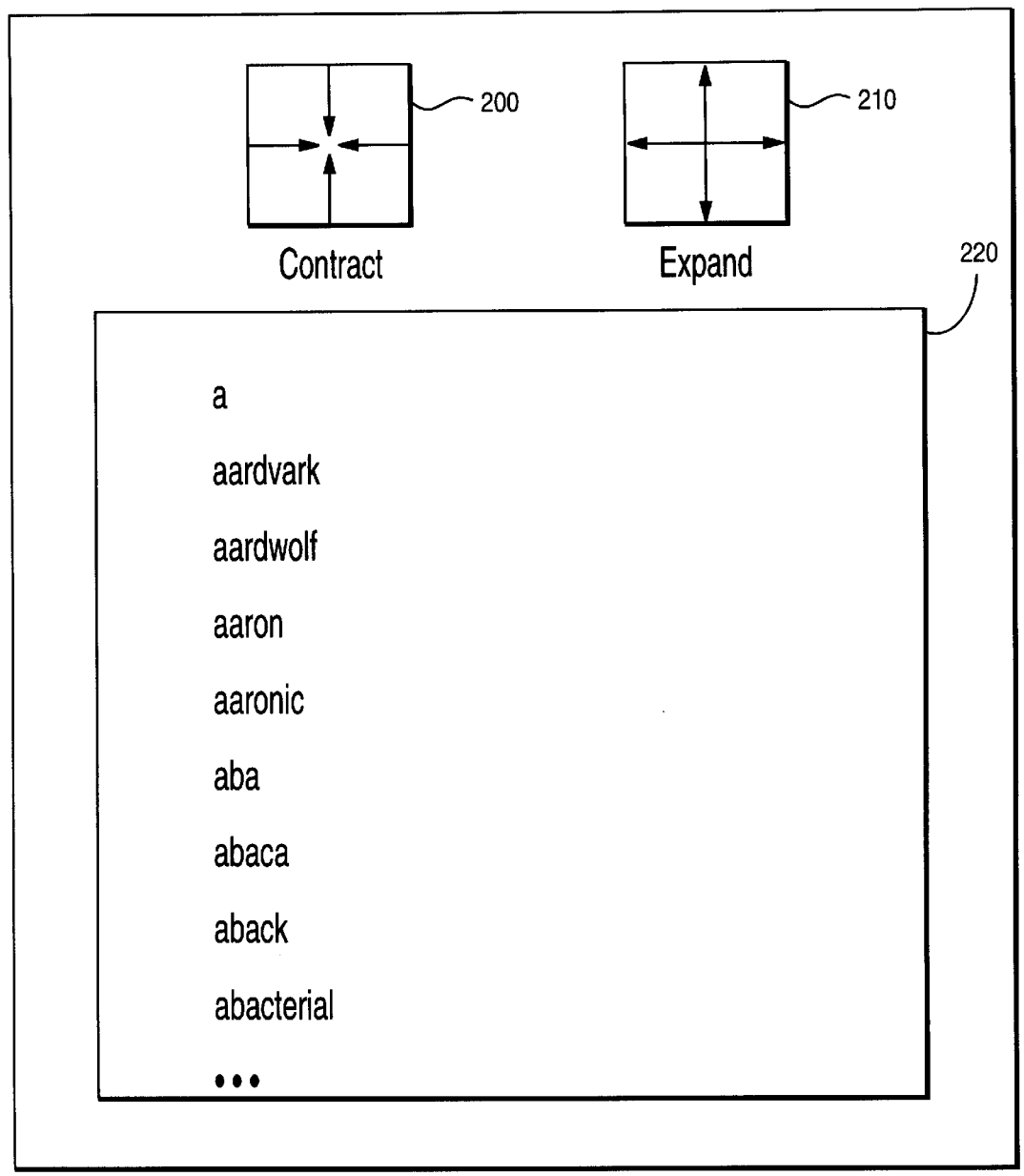
FIG. 7 is an illustration of a displayed list of items.
Figure 8:
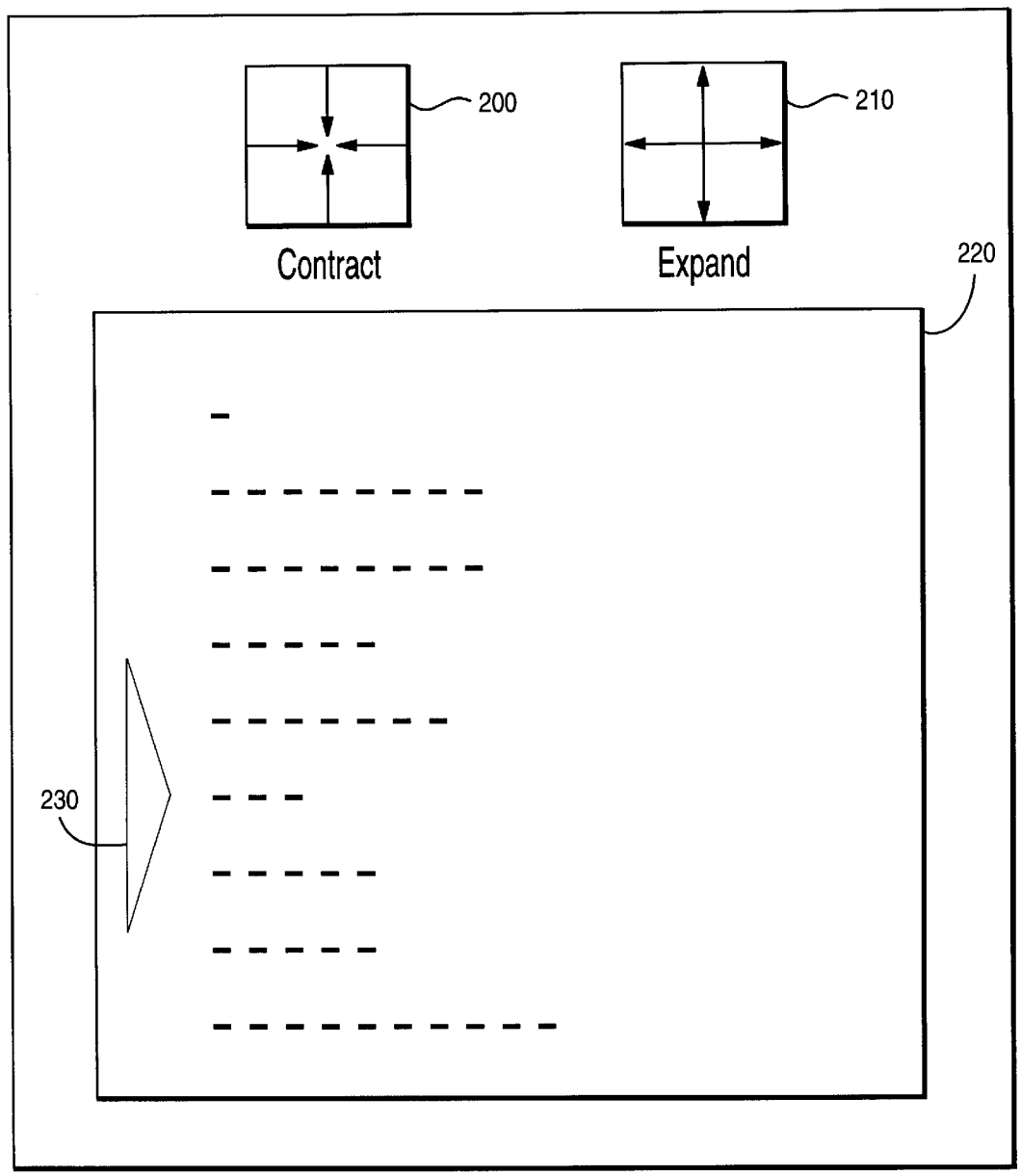
FIG. 8 is a representation of a fully compressed list of items.
Figure 10:
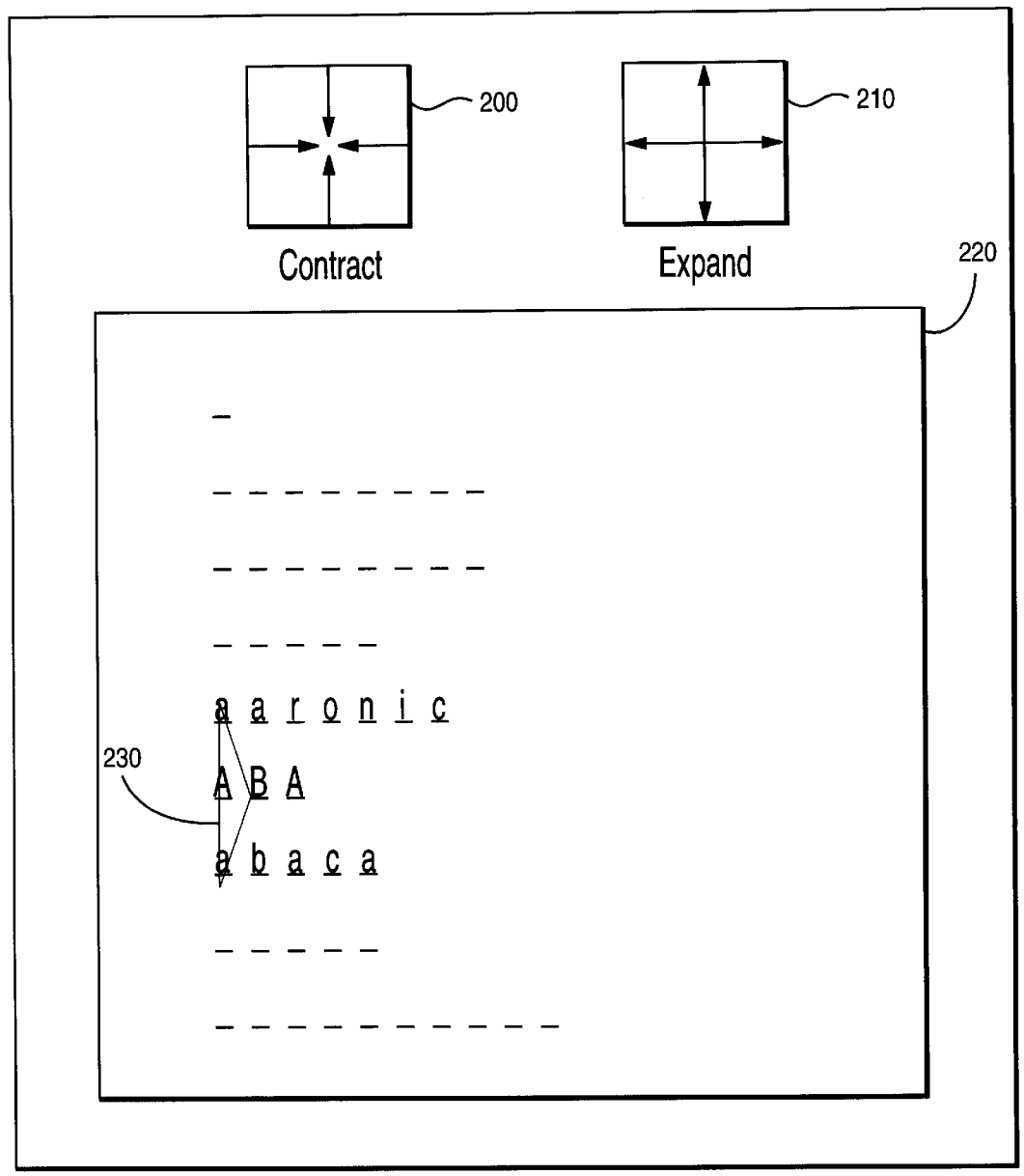
Figure 11:
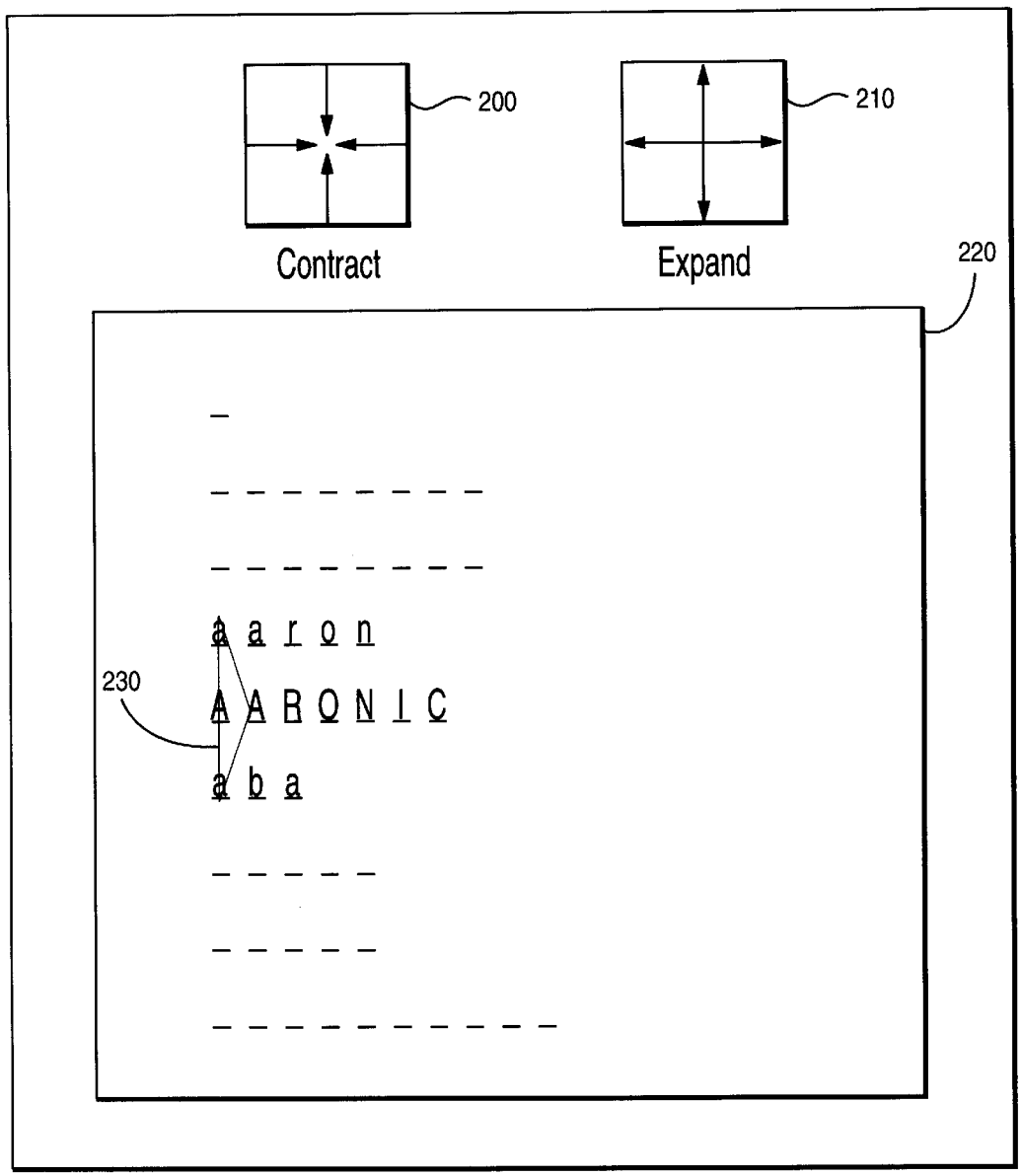

FIG. 7 is an illustration of a displayed list of items and FIG. 8 is a representation of the list of items in a fully compressed state. In FIG. 8, there is also shown a pointer 230. Although the pointer 230 is shown to have a triangular shape, it is obvious to those of ordinary skill in the art that it can be of any shape imaginable without departing from the scope of the present invention. The pointer 230 is used to focus interest on an item. For example, if any part of the pointer 230 touches a fully compressed item, the item will be restored as shown in FIGS. 9, 10 and 11.

Figure 9:
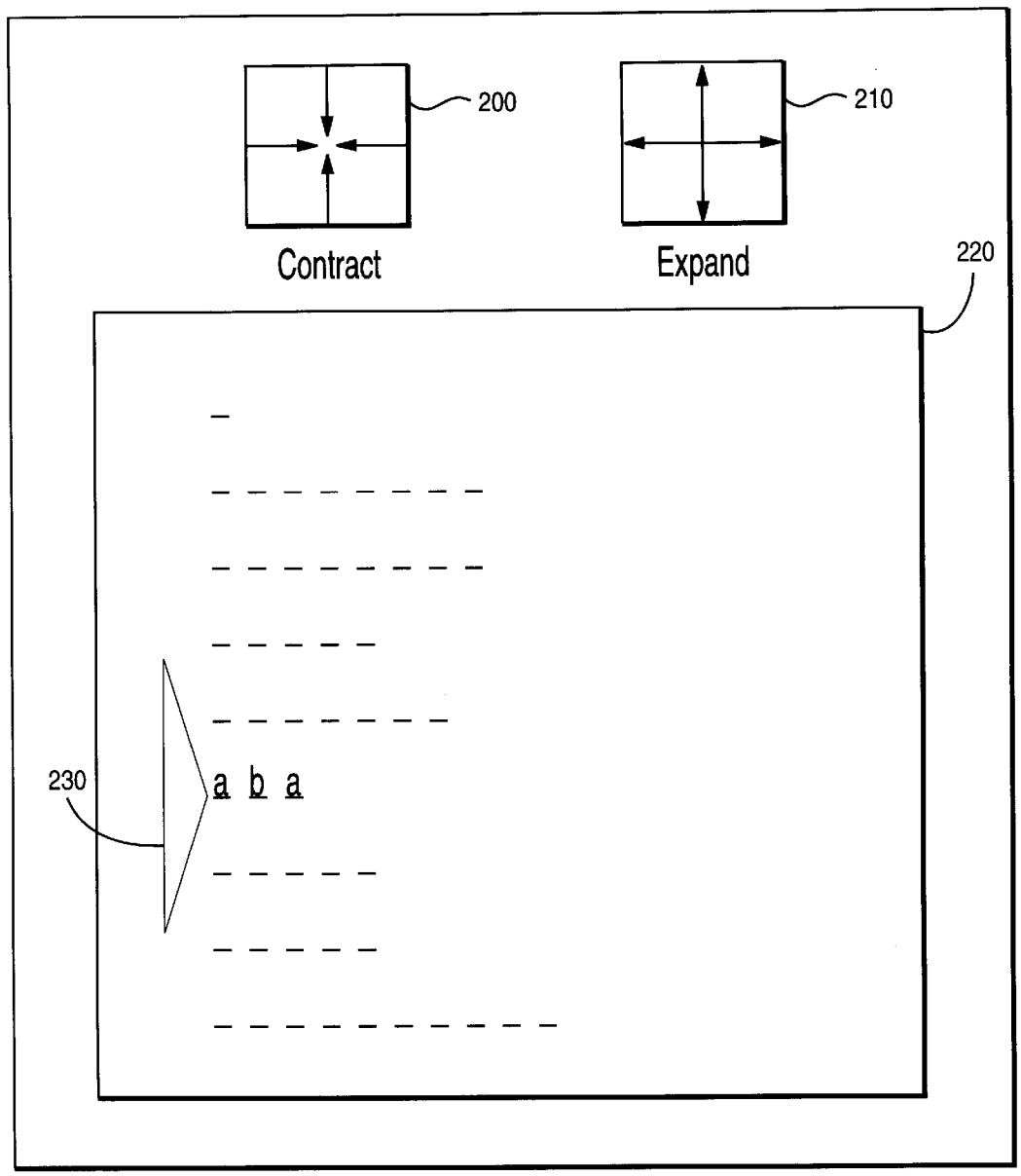
FIGS. 9, 10 and 11 are representations of item by item expansion using a pointer.

In FIG. 9, the pointer 230 from FIG. 8 is moved to the right such that it now touches the first character of the sixth item (i.e., aba) in the list. In response, the item is expanded enough so as to become legible. In FIG. 10, the pointer 230 is furthermoved to the right where it touches the second character of the sixth item; the pointer 230 also touches the fifth item and the seventh item. In response, the sixth item is fully expanded (shown here in capital letters, i.e., ABA) and the fifth item (aaronic), as well as the seventh item (abaca), now becomes legible. In FIG. 11, the pointer 230 is moved up by one item so that it fully touches the fifth item and barely touches the fourth and the sixth items. Accordingly, the fifth item is fully expanded (i.e., AARONIC), the fourth item (aaron) and the sixth item (aba) both become legible. Note that since the pointer 230 no longer touches the seventh item (i.e., abaca), the seventh item reverts to its compressed state. In sum, moving the pointer 230 from one item to another item one is in effect scrolling through the list and expanding the items one at a time while doing so.

Figure 12:
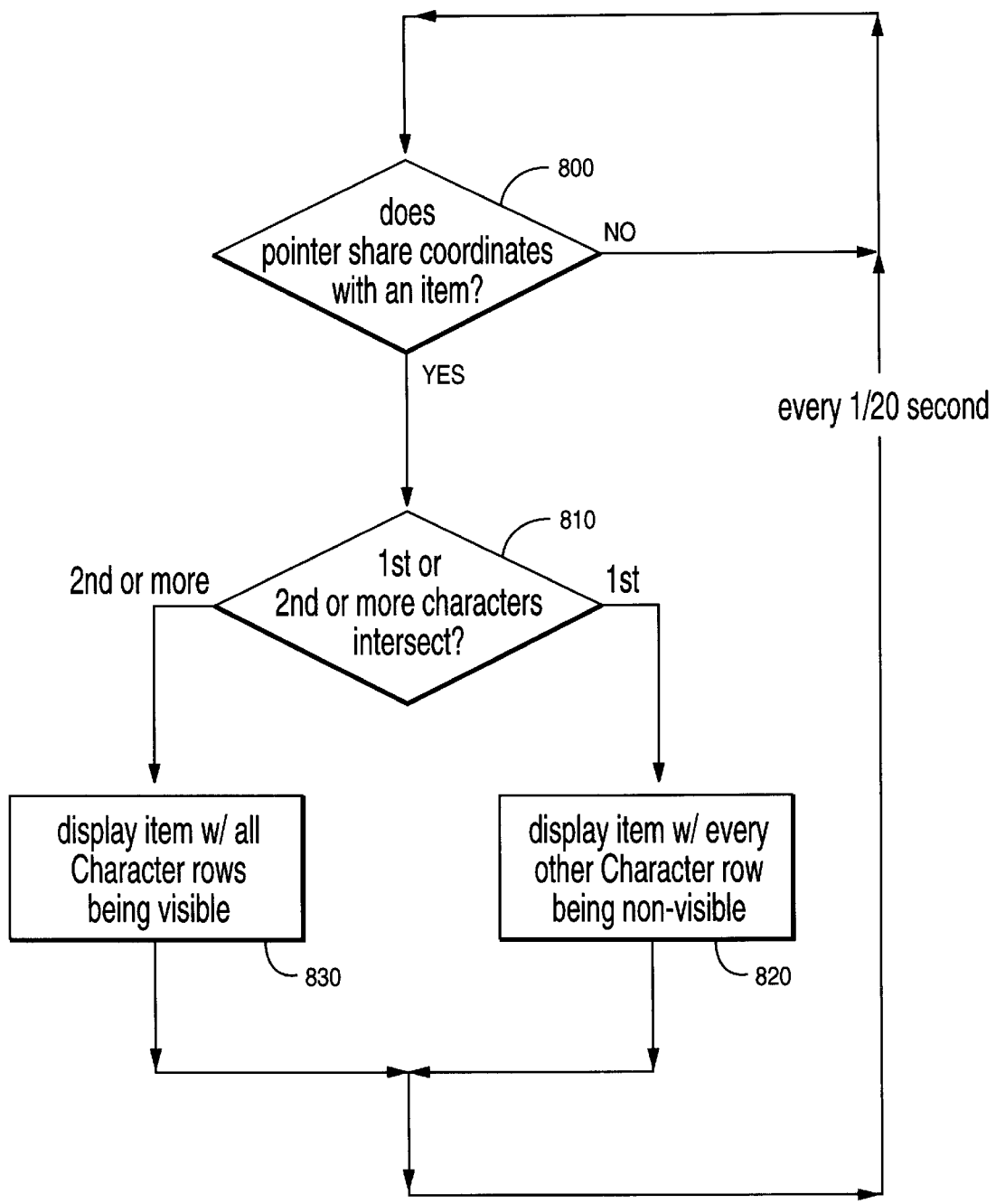
FIG. 12 is a flowchart of an item by item expansion using a pointer.

FIG. 12 is a flowchart of an item by item expansion as used in the present invention. Every one-twentieth (1/20) of a second, a check is made as to whether the pointer 230 shares the same coordinates with any one of the items of the fully compressed list (step 800). It is well known in the art to do coordinate checking. For example, a coordinate check is done each time a user switches from one window to another using the mouse. Hence, coordinate checking is not explained further.

If the pointer 230 does not share any coordinates with any one of the items, the process remains at step 800; otherwise, the process moves to step 810 where it is determined whether the pointer 230 shares coordinates with the first character or the second (or third . . . ) character of the item. If the pointer 230 shares coordinates with the first character of the item, then the item is displayed with every other character row being non-visible (step 820). But, if the pointer 230 shares coordinates with any other character of the item, then the item is displayed fully (step 830). This process repeats itself every one-twentieth (1/20) of a second.

Although the present invention has been fully described above with reference to specific embodiments, other alternative embodiments will be apparent to those of ordinary skill in the art. Therefore, the above description should not be taken as limiting the scope of the present invention defined by the appended claims.

What is claimed is:

1. A method of expanding an item in a list of items, said items being made of a plurality of rows of pixels, said method comprising the steps of:
   displaying said list of items by displaying only one row of pixels per each item; and
   expanding said item by displaying alternate rows of pixels when a pointer touches one character of said item.

2. The method of claim 1 wherein said item is fully expanded by displaying all rows of pixels of said item when said pointer touches more than one character of said item.

3. The method of claim 2 wherein a bitmap of said displayed items is stored in memory, said bitmap including all rows of pixels of all the items on said list.

4. An apparatus for expanding an item in a list of items, said items being made of a plurality of rows of pixels, said apparatus comprising:
   means for displaying said list of items by displaying only one row of pixels per each item; and
   means for expanding said item by displaying alternate rows of pixels when a pointer touches one character of said item.

5. The apparatus of claim 4 wherein said item is fully expanded by displaying all rows of pixels of said item when said pointer touches more than one character of said item.

6. The apparatus of claim 5 wherein a bitmap of said displayed items is stored in memory, said bitmap including all rows of pixels of all the items on said list.

7. A computer program for expanding an item in a list of displayed items, said items being made of a plurality of rows of pixels, said computer program being on a computer usable medium comprising:
   program code means for displaying said list of items by displaying only one row of pixels per each item; and
   program code means for expanding said item by displaying alternate rows of pixels when a pointer touches one character of said item.

8. The computer program of claim 7 wherein said item is fully expanded by displaying all rows of pixels of said item when said pointer touches more than one character of said item.

9. The computer program of claim 8 wherein a bitmap of said displayed items is stored in memory, said bitmap including all rows of pixels of all the items on said list.

* * * * *